(12) United States Patent
Bhattacharya et al.

(10) Patent No.: US 9,555,601 B2
(45) Date of Patent: Jan. 31, 2017

(54) ALUMINIUM BARRIER LAMINATE

(75) Inventors: Satya Prasad Bhattacharya, Mumbai (IN); Mrinal Kanti Banerjee, Mumbai (IN)

(73) Assignee: ESSEL PROPACK LTD., Mumbai (IN)

(*) Notice: Subject to any disclaimer, the term of this patent is extended or adjusted under 35 U.S.C. 154(b) by 492 days.

(21) Appl. No.: 14/122,663

(22) PCT Filed: May 31, 2012

(86) PCT No.: PCT/IN2012/000378
§ 371 (c)(1),
(2), (4) Date: Mar. 7, 2014

(87) PCT Pub. No.: WO2012/164584
PCT Pub. Date: Dec. 6, 2012

(65) Prior Publication Data
US 2014/0186561 A1 Jul. 3, 2014

(30) Foreign Application Priority Data
May 31, 2011 (IN) .................. 1602/MUM/2011

(51) Int. Cl.
*B32B 15/082* (2006.01)
*B32B 15/08* (2006.01)
(Continued)

(52) U.S. Cl.
CPC ............... *B32B 15/082* (2013.01); *B32B 7/02* (2013.01); *B32B 7/12* (2013.01); *B32B 15/08* (2013.01);
(Continued)

(58) Field of Classification Search
CPC ........ B32B 15/082; B32B 15/08; B32B 15/20; B32B 27/08; B32B 27/20; B32B 27/308; B32B 27/31; B32B 1/08; B32B 7/02; B32B 7/12; B32B 27/16; Y10T 428/256; Y10T 428/24959; Y10T 428/24992; Y10T 428/1359; Y10T 428/24975; Y10T 428/31692; C08J 5/124
See application file for complete search history.

(56) References Cited

U.S. PATENT DOCUMENTS 4,539,259 A 9/1985 Zuscik
7,744,970 B2 6/2010 Silverman et al.
(Continued)

FOREIGN PATENT DOCUMENTS

EP 0164232 B2 1/1993
WO 2006102592 A1 9/2006
(Continued)

OTHER PUBLICATIONS

International Search Report for PCT/IN2012/000378 mailed Apr. 22, 2014.

*Primary Examiner* — Michael C Miggins
(74) *Attorney, Agent, or Firm* — Knobbe Martens Olson & Bear LLP

(57) ABSTRACT

The present subject matter relates to a laminate comprising: an outer layer of 50% to 70% of High Density Polyethylene (HDPE) and 50% to 30% of Linear Low Density Polyethylene (LLDPE); an aluminum core layer disposed between Ethylene Acrylic Acid (EAA) layers; and an inner layer of about 50% to 70% of High Density Polyethylene (HDPE) and 50% to 30% of Linear Low Density Polyethylene (LLDPE). The outer polyethylene layer or inner polyethylene layer is a multilayer film, preferably three layer film. The present subject matter also relates to a process for the preparation of the laminate.

22 Claims, 2 Drawing Sheets

(51) Int. Cl.
  *B32B 15/20* (2006.01)
  *B32B 27/08* (2006.01)
  *B32B 27/20* (2006.01)
  *B32B 27/30* (2006.01)
  *B32B 27/32* (2006.01)
  *B32B 7/02* (2006.01)
  *B32B 7/12* (2006.01)
  *C08J 5/12* (2006.01)
  *B32B 27/16* (2006.01)
  *B32B 1/08* (2006.01)

(52) U.S. Cl.
  CPC ............... *B32B 15/20* (2013.01); *B32B 27/08* (2013.01); *B32B 27/16* (2013.01); *B32B 27/20* (2013.01); *B32B 27/308* (2013.01); *B32B 27/32* (2013.01); *C08J 5/124* (2013.01); *B32B 1/08* (2013.01); *Y10T 428/1359* (2015.01); *Y10T 428/24959* (2015.01); *Y10T 428/24975* (2015.01); *Y10T 428/24992* (2015.01); *Y10T 428/256* (2015.01); *Y10T 428/31692* (2015.04)

(56) References Cited

U.S. PATENT DOCUMENTS

| | | |
|---|---|---|
| 7,803,857 B2 | 9/2010 | Kliesch et al. |
| 7,892,391 B2 | 2/2011 | Kendig et al. |
| 7,939,169 B2 | 5/2011 | McGee et al. |
| 8,377,532 B2 | 2/2013 | Maurice et al. |
| 2007/0260016 A1 | 11/2007 | Best et al. |
| 2008/0233375 A1 | 9/2008 | Wright et al. |

FOREIGN PATENT DOCUMENTS

| | | |
|---|---|---|
| WO | 2007130277 A1 | 11/2007 |
| WO | 2010100490 A1 | 9/2010 |
| WO | 2012151679 A1 | 11/2012 |

ALUMINIUM BARRIER LAMINATE

CROSS-REFERENCE TO RELATED APPLICATIONS

This application is the U.S. National Phase under 35. U.S.C. §371 of International Application PCT/IN2012/000378, filed May 31, 2012, which claims priority to Indian Patent Application No. 1602/MUM/2011, filed May 31, 2011. The disclosures of the above-described applications are hereby incorporated by reference in their entirety.

TECHNICAL FIELD

The present subject matter, in general, relates to the field of laminates, in particular to an Aluminum based laminate. The present subject matter also relates to an article made of the aluminum based laminate.

BACKGROUND

For manufacturing of a laminated tube of large diameter, such as 25 mm and beyond, the stiffness or the body strength of the laminated tube becomes an important attribute. In general, laminate of thickness of about 250μ a and higher are typically used for manufacturing tubes of larger diameter.

Usual polymer combinations used for making such laminated tubes are selected from Low Density Polyethylene (LDPE), Linear Low Density Polyethylene (LLDPE), High Density Polyethylene (HDPE), Ethylene Vinyl Alcohol (EVOH) etc. In some manufacturing processes, Polypropylene (PP) is also used as a one of the polymers.

Polypropylene being an inert polymer is very difficult to bond with other poly ethylene film substrates. Moreover, Polypropylene requires comparatively high temperature to seal with each other. HDPE polymer, on the other hand, is easier to process singularly or in combination with other low and medium density Polyethylene. HDPE polymers based film could be manufactured by co-extruded Cast or co-extruded blown. Pure High Density Polyethylene film and laminate is known to have poor Environmental Stress Crack Resistance (ESCR) and poor Impact resistance.

SUMMARY

This summary is provided to introduce concepts related to aluminum based laminate. These concepts are further described below in the detailed description.

The subject matter described herein relates to an aluminum based laminate having higher thickness, such as thickness of about 250 μ that may be used for manufacturing laminated tubes with large diameter, such as diameter of at least about 25 mm to 38 mm.

The laminate of the present disclosure comprises an outer polyethylene layer, a core aluminum layer and an inner polyethylene layer.

In an aspect of the present subject matter, the outer polyethylene layer and the inner polyethylene layer of the laminate further comprise of a Poly Alfa Olefin (PAO).

In one aspect of the present subject matter, the core aluminum layer is sandwiched between Ethylene Acrylic Acid (EAA) layers that serve as tie layers. In another aspect of the present subject matter, the core aluminum layer of the laminate comprises of a priming layer of Ethylene Acrylic Acid (EAA) on one side and an extrusion coating layer of Ethylene acrylic acid (EAA) on the other. The priming layer is followed by an extrusion layer of a low density Polyethylene (LDPE). The laminate of the present subject matter optionally comprises of pigments.

These and other features, aspects, and advantages of the present subject matter will become better understood with reference to the following description. This summary is provided to introduce a selection of concepts in a simplified form. This summary is not intended to identify key features or essential features of the subject matter, nor is it intended to be used to limit the scope of the subject matter.

BRIEF DESCRIPTION OF THE DRAWINGS

The above and other features, aspects, and advantages of the subject matter will become better understood with regard to the following description, appended claims, and accompanying drawings where:

DETAILED DESCRIPTION

Figure 1:
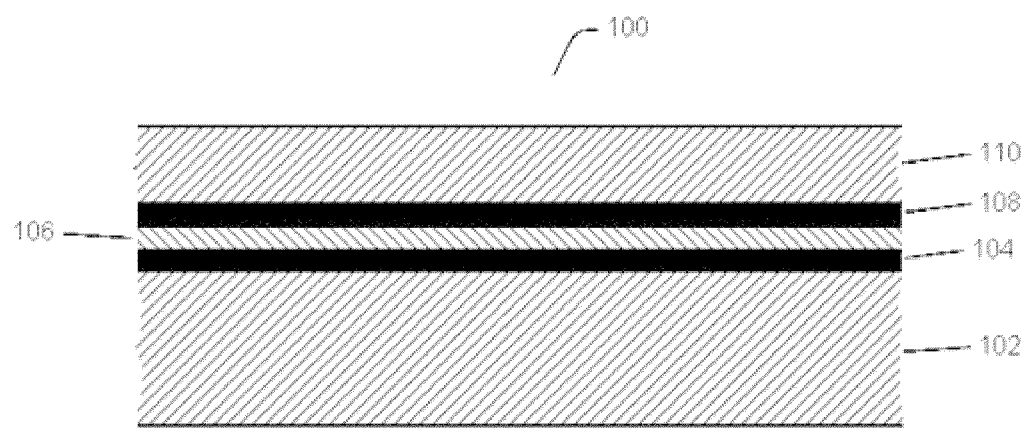
FIG. 1 illustrates an exemplary structure of the laminate, in accordance with an embodiment of the present subject matter.

Conventionally, a laminate with lower thickness, such as thickness of around 200 μ cannot be used for tubing of large diameter, such as diameter of about 25 mm, 38 mm or higher. The reason for this is a possibility of tubing failure in burst test. Another reason is possibility of failure in drop test, when a product is filled inside such tubing. Further, High Density Polyethylene (HDPE) being highly crystalline polymer, it is essential to suitably modify High Density Polyethylene (HDPE) with other thermoplastic polyethylene to achieve High Density Polyethylene (HDPE) film surface polarity and elasticity.

The present subject matter relates to a laminate comprising: an outer layer of 50% to 70% of High Density Polyethylene (HDPE) and 50% to 30% of Linear Low Density Polyethylene (LLDPE); an aluminum core layer disposed between Ethylene Acrylic Acid (EAA) layers; and an inner layer of 50% to 70% of High Density Polyethylene (HDPE) and 50% to 30% of Linear Low Density Polyethylene (LLDPE). The Linear low density polyethylene (LLDPE) in accordance with the present subject matter can have density around 0.912 g/cc to 0.940 g/cc, preferably 0.927 gm/cc. These may be Metallocene LLDPE or LLDPE formed using other catalyst such as Ziegler-Natta. The High Density Polyethylene (HDPE) in accordance with the present subject matter can have density around 0.930 g/cc to 0.970 g/cc.

In one of the embodiments, the outer polyethylene layer and the inner polyethylene layer are independently a multilayer film, preferably a three layer film.

In another embodiment, the outer polyethylene layer of the laminate comprises a film layer of about 10%-20% of a Poly Alpha Olefin (PAO), preferably 15% and 25%-35% of Linear low density polyethylene (LLDPE). The PAO used in said embodiment are notably commercially available PAOs such as "Elite 5815" from Dow Chemical, "Exceed 1012CA" from ExxonMobil chemical.

In yet another embodiment, said Poly Alpha Olefin (PAO) is present in at least one of the layer in the outer polyethylene layer, wherein the outer polyethylene layer is a multilayer film.

In another embodiment, the inner polyethylene layer of the laminate comprises of a film layer of about 10%-20% of a Poly Alpha Olefin (PAO), preferably 15%.

It is also an embodiment of the present subject matter wherein the outer polyethylene layer comprises of at least a pigment. Pigments are preferably introduced in the outer layer during blown film making process in a form of Master Batch in which $TiO_2$ or $CaCO_3$ is impregnated.

In still another embodiment, the pigment is introduced in the middle layer of a three layer film in the outer polyethylene layer.

Non limitative examples of pigments in accordance with the present disclosure include titanium dioxide ($TiO_2$), zinc disulfide ($ZnS_2$), zinc oxide (ZnO), barium sulfate ($BaSO_4$) and Calcium Carbonate ($CaCO_3$). The pigment may be chosen depending upon the desired color to be imparted to the laminate.

The shape of the pigment is not particularly limited; they may be notably granule, round, flaky, flat and so on. The white pigment is preferably titanium dioxide. The titanium dioxide used in the instant compositions is any of the notably commercially available, as White Master Batch for Linear low density polyethylene (LLDPE). Films from local vendors or manufactured by Clarient, Ampacet, Schulman etc. and available internationally. In the present invention rutile $TiO_2$ is used as white pigment and would like to include $CaCO_3$ as well.

Titanium dioxide is not particularly limited, and a variety of crystalline forms such as the anatase form, the rutile form and the monoclinic type can be used. The preferably average particle size of the titanium oxide is in the range of 0.15 μm to 0.35 μm.

The laminate of the subject matter can be used for manufacturing tubing with high diameter, such as diameter of about 25 mm to about 38 mm. It will be understood that the laminate of the present disclosure is also suitable for making tubes from about 13 mm diameter to 22 mm diameters as well.

The laminate in accordance with the present subject matter is prepared using High density polyethylene (HDPE) and Linear low density polyethylene (LLDPE), while maintaining flexibility, impact resistance, and compliance with drop test of the laminate. Therefore, the laminate in accordance with the present subject matter is rigid, flexible and have good impact resistance as demanded by tubing with large diameter. Further, the laminate is versatile in terms of processing window as the laminate is capable of running in high speed, low speed, and mini tube line with diameter ranging from 13 mm to 38 mm. Thus, a single laminate may be used for manufacturing tubes of a variety of diameters, thereby reducing inventory of customers as the customers need not purchase different laminates for different products. The tubes of various diameters that can be manufactured using the laminate may find application in carrying products like tooth paste, pharmaceutical preparations, cosmetic, etc.

In an embodiment, an article can be made of the laminate.

In another embodiment, the article made of the laminate is a tube with a diameter of 13 mm to 38 mm.

The outer layer or the print layer of the laminate of the present subject matter may be prepared, for example, by a blown film extrusion process. During the extrusion process, along with the High density polyethylene (HDPE) and Linear low density polyethylene (LLDPE) granules, the pigment, if used, is also melted and color of the pigment is diffused into the entire polymer matrix, to produce a colored outer layer.

The inner layer or the sealant layer of the laminate of the present subject matter is prepared in the similar manner as the outer layer of the laminate. In a preferred embodiment, the inner layer is devoid of pigment.

The core layer or the barrier layer of the laminate of the present disclosure comprises of an Aluminium (Al) foil. While using Aluminium (Al) foil as a barrier layer between the inner layer and the outer layer composed of Polyethylene, a polar group, such as Ethylene Acrylic Acid (EAA) is required to hold Aluminium (Al) foil at one side, and a Polyethylene on the other side.

In an embodiment of the present subject matter the aluminum core layer is disposed between two Ethylene Acrylic Acid (EAA) layers.

In another embodiment, the Ethylene Acrylic Acid (EAA) layer on one side of the aluminum core layer is prepared by priming the aluminum core layer with partially cross-linked Ethylene Acrylic Acid (EAA) suspension. The priming is typically known as a preparatory coating on a surface to improve adhesion. The Ethylene Acrylic Acid (EAA) layer prepared by priming process is referred to as primer layer. In said embodiment, this primer layer is followed by lamination with an adhesive layer composed of Low Density Polyethylene (LDPE). This is preferably done to make the laminate of the present subject matter cost effective, because, Ethylene Acrylic Acid (EAA) is typically costly, so rather than having Ethylene Acrylic Acid (EAA) layer on both the sides of the aluminum core layer, the primer layer of Ethylene Acrylic Acid (EAA) suspension followed by Low density polyethylene (LDPE) adhesive layer is used on one side of aluminum core layer to save cost. While retaining the use of Ethylene Acrylic Acid (EAA) layer on the other side of the aluminum core layer for achieving better adhesion and maintain rigidity of the laminate.

The Low density polyethylene (LDPE) used in the laminate of the present subject matter is preferably of density around 0.918 g/cc to 0.935 g/cc, preferably 0.918 gm/cc.

In yet another embodiment, the laminate comprising: an outer layer of 50% to 70% of High Density Polyethylene (HDPE) and 50% to 30% of Linear Low Density Polyethylene (LLDPE) having a thickness of 100μ; an aluminium core layer disposed between Ethylene Acrylic Acid (EAA) having a thickness of 12μ; and an inner layer of 50% to 70% of High Density Polyethylene (HDPE) and 50% to 30% of Linear Low Density Polyethylene (LLDPE) having a thickness of 50μ.

In another embodiment of the laminate, the outer polyethylene layer and the inner polyethylene layer comprises Poly Alpha Olefins (PAO) of about 15% wt/wt. Poly alpha olefins (PAO) is used to provide flexibility to the laminate.

In still another embodiment, the laminate comprising: an outer layer of 50% to 70% of High Density Polyethylene (HDPE) and 50% to 30% of Linear Low Density Polyethylene (LLDPE) having a thickness of 100μ; an inner layer of 50% to 70% of High Density Polyethylene (HDPE) and 50% to 30% of Linear Low Density Polyethylene (LLDPE) having a thickness of 50μ; an aluminium core layer disposed between a priming layer of Ethylene Acrylic Acid (EAA) on one side and coating layer of Ethylene acrylic acid (EAA) on the other side having a thickness 50μ; and an adhesive layer of Low Density Polyethylene (LDPE) between the outer polyethylene layer and Ethylene acrylic acid (EAA) priming layer having a thickness of 25μ.

In an embodiment, a process for the preparation of laminate comprising: extrusion of High Density Polyethylene (HDPE) and Linear Low Density Polyethylene (LLDPE) along with pigments by blown film extrusion process to form the outer polyethylene layer; wherein, the pigments is melted and color is diffused into the outer polyethylene layer; disposing an aluminium core layer between Ethylene Acrylic Acid (EAA); and extrusion of High Density Polyethylene (HDPE) and Linear Low Density Polyethylene (LLDPE) by blown film extrusion process to form the inner polyethylene layer; wherein, the inner layer is devoid of pigments.

In another embodiment, the process for the preparation of laminate comprising: extrusion of High Density Polyethylene (HDPE) and Linear Low Density Polyethylene (LLDPE) along with pigments by blown film extrusion to form the outer polyethylene layer; wherein the pigments is melted and color is diffused into the entire polymer matrix; extrusion of High Density Polyethylene (HDPE) and Linear Low Density Polyethylene (LLDPE) by blown film extrusion to form the inner polyethylene layer; wherein, the inner layer is devoid of pigments; disposing an aluminium core layer between a priming layer of Ethylene Acrylic Acid (EAA) on one side and coating layer of Ethylene acrylic acid (EAA) on the other side; and laminating with an adhesive layer composed of Low Density Polyethylene (LDPE); wherein, priming layer is prepared by priming the aluminium core layer with partially cross-linked Ethylene acrylic acid (EAA) suspension.

In one of the embodiment, FIG. 1 illustrates an exemplary structure of the laminate. The laminate 100, according to FIG. 1, comprises a 100 μ thick outer layer 102 of High density polyethylene (HDPE) polymer and Linear low density polyethylene (LLDPE) polymer, a 50 μ thick inner layer 110 comprising of High density polyethylene (HDPE) polymer and Linear low density polyethylene (LLDPE) polymer, and 12 μ thick core layer 106 of Aluminum (Al) foil sandwiched between Ethylene Acrylic Acid (EAA) on both the sides, represented as EAA layers 104 and 108 in FIG. 1. The outer layer 102 serves as a printing layer, the inner layer 110 serves as a sealant layer, and the core layer 106 serves as a barrier layer.

Figure 2:
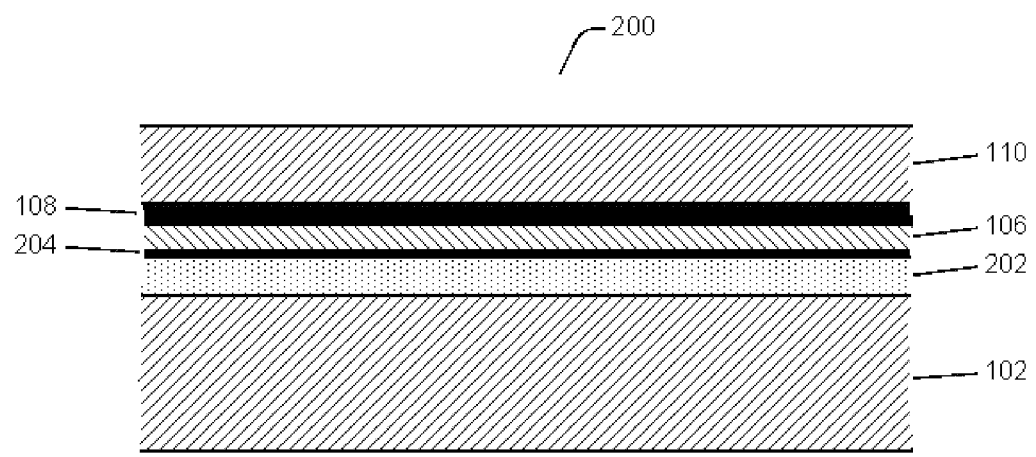
FIG. 2 illustrates an exemplary structure of the laminate, in accordance with another embodiment of the present subject matter.

In yet another embodiment, FIG. 2 illustrates another exemplary structure of the laminate. The laminate 200, according to FIG. 2, comprises a 100μ thick outer layer 102 of High Density Polyethylene (HDPE); Linear low density polyethylene (LLDPE) polymers, a 50 μ thick inner layer 110 of High Density Polyethylene (HDPE) and Linear low density polyethylene (LLDPE) polymers; and 50 μ thick core layer 106 of Aluminum (Al) foil sandwiched between the outer layer 102 and the inner layer 110. In said embodiment, the laminate 200 comprises a coating of Ethylene Acrylic Acid (EAA) on one side of the core layer 106, preferably, towards the side facing the inner layer 110. While, the laminate 200 comprises a primer layer 204, followed by a 25 μ thick adhesive layer 202 of Low density polyethylene (LDPE) on other side of the core layer 106, preferably, towards the side facing the outer layer 102. The primer layer 204 is prepared by priming one the other side of the core layer 106 with a partially cross-linked Ethylene acrylic acid (EAA). Such primer layer 204 is then followed by the adhesive layer 204. The adhesive layer 204 is prepared, for example, by extrusion process. In the embodiment illustrated in FIG. 2, one of the two Ethylene acrylic acid (EAA) layers (104, 108), preferably Ethylene acrylic acid (EAA) layer 104 as described in the embodiment shown in FIG. 1, is replaced by a primer layer followed by a Low density polyethylene (LDPE) layer, which is cost effective. While, the use of Ethylene acrylic acid (EAA) layer 108 is retained on the one side of the aluminum core layer for achieving better adhesion and maintain rigidity of the laminate.

Although the subject matter has been described in considerable detail with reference to certain preferred embodiments thereof, other embodiments are possible. As such, the spirit and scope of the disclosure should not be limited to the description of the preferred embodiment contained therein.

We claim:

1. A laminate comprising:
    an outer layer of 50% to 70% of a High Density Polyethylene (HDPE) and 50% to 30% of a Linear Low Density Polyethylene (LLDPE);
    an aluminium core layer disposed between Ethylene Acrylic Acid (EAA); and
    an inner layer of 50% to 70% of a High Density Polyethylene (HDPE) and 50% to 30% of a Linear Low Density Polyethylene (LLDPE),
    wherein the outer polyethylene layer comprises a film and the middle layer of the three-layer film comprises a pigment.

2. The laminate as claimed in claim 1, wherein the density of Linear Low Density Polyethylene (LLDPE) is in the range of 0.912 g/cc to 0.940 g/cc, preferably 0.927 g/cc and the density of High Density Polyethylene (HDPE) is in the range of 0.930 g/cc to 0.970 g/cc.

3. The laminate as claimed in claim 1, wherein the pigments are selected from titanium dioxide ($TiO_2$), zinc disulfide ($ZnS_2$), zinc oxide (ZnO), barium sulfate ($BaSO_4$) or calcium carbonate ($CaCO_3$).

4. The laminate as claimed in claim 1, wherein the outer polyethylene layer and the inner polyethylene layer are independently a multilayer film.

5. The laminate as claimed in claim 4, wherein the outer polyethylene layer and the inner polyethylene layer are a three layer film.

6. The laminate as claimed in claim 1, wherein the outer polyethylene layer comprises a film layer of 10% -20% of a Poly Alpha Olefin (PAO), and 25%-35% of a Linear low density polyethylene (LLDPE).

7. The laminate as claimed in claim 6, wherein the Poly Alpha Olefin (PAO) is present in at least one of the layer in the outer polyethylene layer.

8. The laminate as claimed in claim 6, wherein the outer polyethylene layer comprises a film layer of 15% of a Poly Alpha Olefin (PAO) and 25%-35% of a Linear low density polyethylene (LLDPE).

9. The laminate as claimed in claim 1, wherein the inner polyethylene layer of the laminate comprises of a film layer of about 10%-20% of a Poly Alpha Olefin (PAO).

10. The laminate as claimed in claim 9, wherein the inner polyethylene layer of the laminate comprises of a film layer of about 15% of a Poly Alpha Olefin (PAO).

11. The laminate as claimed in claim 1, wherein the pigment is rutile titanium dioxide ($TiO_2$) or calcium carbonate ($CaCO_3$), or combination thereof.

12. The laminate as claimed in claim 11, wherein the particle size of the titanium oxide ($TiO_2$) is in the range of 0.15 μm to 0.35 μm.

13. The laminate as claimed in claim 1 wherein,
    the outer layer has a thickness of 100μ;
    the aluminium core layer has a thickness of 12μ; and
    the inner layer has a thickness of 50μ.

14. The laminate as claimed in claim 13, wherein the outer polyethylene layer and inner polyethylene layer comprises Poly Alpha Olefins (PAO) of 15% wt/wt.

15. An article made of the laminate as claimed in claim 13.

16. A laminate comprising:
    an outer layer of 50% to 70% of High Density Polyethylene (HDPE) and 50% to 30% of Linear Low Density Polyethylene (LLDPE) having a thickness of 100μ;

an inner layer of 50% to 70% of High Density Polyethylene (HDPE) and 50% to 30% of Linear Low Density Polyethylene (LLDPE) having a thickness of 50μ an aluminium core layer disposed between a priming layer of Ethylene Acrylic Acid (EAA) on one side and coating layer of Ethylene Acrylic Acid (EAA) on the other side having a thickness 50μ; and an adhesive layer of Low Density Polyethylene (LDPE) between the outer polyethylene layer and Ethylene acrylic acid (EAA) priming layer having a thickness of 25μ, wherein the outer polyethylene layer is a three-layer film and the middle layer of the three-layer film comprises pigments.

17. The laminate as claimed in claim 16, wherein the primer layer is prepared by priming the aluminium core layer with partially cross-linked Ethylene acrylic acid (EAA) suspension.

18. An article made of the laminate as claimed in claim 16.

19. An article made of the laminate as claimed in claim 1.

20. The article as claimed in claim 19, wherein the article is a tube with a diameter of 13 mm to 38 mm.

21. A process for the preparation of laminate as claimed in claim 1, said process comprising:

extrusion of High Density Polyethylene (HDPE) and Linear Low Density Polyethylene (LLDPE) along with pigments by blown film extrusion process to form the outer polyethylene layer;

wherein, the pigments are melted and color is diffused into the middle layer of the outer polyethylene layer;

disposing an aluminium core layer between Ethylene Acrylic Acid (EAA); and extrusion of High Density Polyethylene (HDPE) and Linear Low Density Polyethylene (LLDPE) by blown film extrusion process to form the inner polyethylene layer, wherein, the inner layer is devoid of pigments.

22. The process for the preparation of laminate as claimed in claim 21, said process comprising:

extrusion of High Density Polyethylene (HDPE) and Linear Low Density Polyethylene (LLDPE) along with pigments by blown film extrusion to form the outer polyethylene layer;

wherein the pigments is melted and color is diffused into the outer polyethylene layer;

extrusion of High Density Polyethylene (HDPE) and Linear Low Density Polyethylene (LLDPE) by blown film extrusion to form the inner polyethylene layer;

wherein, the inner layer is devoid of pigments disposing an aluminium core layer between a priming layer of Ethylene Acrylic Acid (EAA) on one side and coating layer of Ethylene acrylic acid (EAA) on the other side; and laminating with an adhesive layer composed of Low Density Polyethylene (LDPE);

wherein, priming layer is prepared by priming the aluminium core layer with partially cross-linked Ethylene acrylic acid (EAA) suspension.

* * * * *